United States Patent [19]

Althoff et al.

[11] 4,137,102

[45] Jan. 30, 1979

[54] ALUMINUM ALLOY PRODUCTS OF HIGH CORROSION RESISTANCE AND DEFORMABILITY

[75] Inventors: Jürgen Althoff, Oberursel; Kurt Jäger, Rodheim v.d.H.; Heinz Lommel, Neu-Anspach; Manfred Möller, Bad Vilbel; Manfred Pötzschke, Kronberg, all of Germany

[73] Assignee: Metallgesellschaft Aktiengesellschaft, Frankfurt am Main, Germany

[21] Appl. No.: 700,781

[22] Filed: Jun. 29, 1976

[30] Foreign Application Priority Data

Jun. 30, 1975 [DE] Fed. Rep. of Germany ....... 2529064
Dec. 8, 1975 [DE] Fed. Rep. of Germany ....... 2555095

[51] Int. Cl.$^2$ ............................................. C22C 21/00
[52] U.S. Cl. ................................... 148/31.5; 75/138; 75/142; 75/143; 75/147; 75/148; 148/2; 148/11.5 A; 148/32
[58] Field of Search .................. 75/138, 148, 143, 147, 75/142; 148/32, 32.5, 31.5, 11.5 A, 2

[56] References Cited

U.S. PATENT DOCUMENTS

| | | | |
|---|---|---|---|
| 1,830,142 | 11/1931 | Taylor et al. | 75/138 |
| 3,219,492 | 11/1965 | Anderson et al. | 75/138 |

*Primary Examiner*—R. Dean
*Attorney, Agent, or Firm*—Karl F. Ross

[57] ABSTRACT

In the fabrication of an exhaust system of an internal-combustion engine, a tube-bank heat exchanger, a ducted-plate solar collector, saline water reclamation plant and enameled kitchenware, the improvement which comprises the use of a wrought aluminum alloy consisting essentially of:

0.8 to 2.2% by weight manganese,
0.1 to 0.5% by weight zirconium,
0 to 1.0% by weight iron,
0 to 0.6% by weight silicon,
0 to 0.5% by weight copper,
0 to 0.1% by weight magnesium, balance aluminum and unavoidable impurities.

10 Claims, 1 Drawing Figure

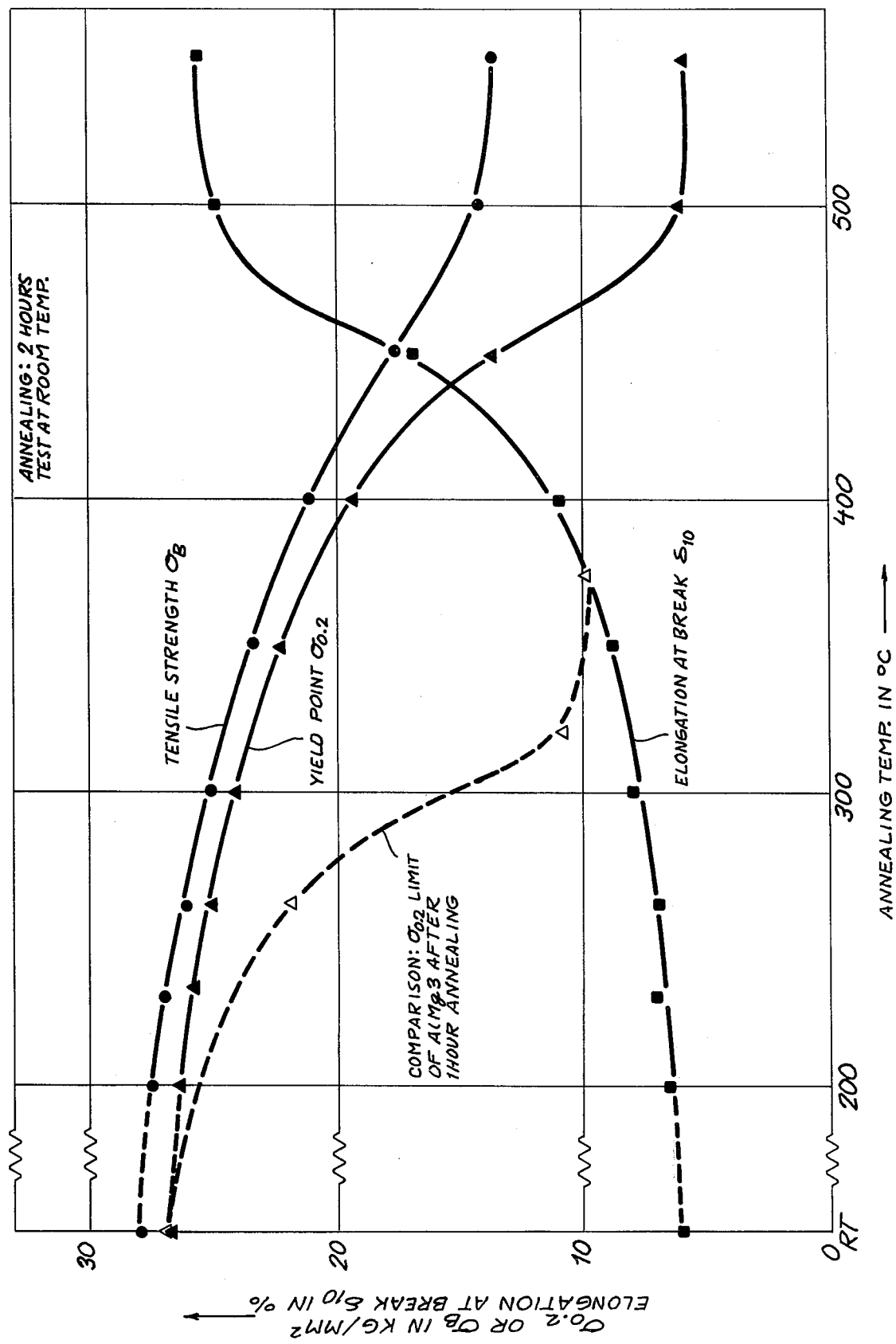

ALUMINUM ALLOY PRODUCTS OF HIGH CORROSION RESISTANCE AND DEFORMABILITY

FIELD OF THE INVENTION

This invention relates to a wrought aluminum alloy, its use as a material for parts which require a material which has a good deformability and resistance to corrosion and a recrystallization temperature much higher than that of the known wrought aluminum alloys which cannot be precipitation-hardened.

BACKGROUND OF THE INVENTION

It is known that wrought aluminum alloys have some properties which considerably restrict their fields of application. Specifically, cold-hardened semi-finished products lose strength at comparatively low temperatures after a short time. This loss of strength, to a soft state, takes place as a rule within a very narrow temperature range.

Numerous attempts have been made to explain and influence this behavior of wrought aluminum alloys. For instance, "*Aluminium und Aluminiumlegierungen*" by Altenpohl (1965) contains about 60 pages of test results and explanations by various authors, who agree that virtually all wrought aluminum alloys which have been tested exhibit a very steep loss of strength between 200° and 300° C. While this loss of strength can slightly be influenced by various measures, an economical and appreciable improvement cannot be effected with the manufacturing methods which are available for normal production of semi-finished products and the like, also in view of economic aspects.

Exceptions are wrought aluminum alloys which contain copper, but these have only a limited deformability and their use is restricted by their low resistance to corrosion.

More recently, it has been attempted, with some success, to improve the loss of strength of wrought aluminum alloys having a relatively high manganese content, by casting the alloy with a much higher solidification rate. High solidification rates can readily be obtained in laboratory work but cannot be achieved in conventional commercial production because special casting methods and equipment are required, which cannot be used with the required safety of operation, at least at the present time, so that the desired improvement of the loss of strength cannot yet be obtained at appreciable production rates and with the desired economy.

The alloy of the invention can be used, inter alia, for exhaust systems for internal combustion engines, tube-bank heat exchangers, ducted plates for solar energy collectors and saline-water reclamation plants, as well as in articles such as kitchen vessels, which can be coated with vitreous enamel and resist corrosion and which must have a high buckling strength in the finished state.

To test materials for the last-mentioned purpose as to their suitability for being coated with vitreous enamel, it is customary to immerse enameled sheet specimens having bright cut edges into a solution of 10 to 20 grams antimony (III) chloride in 1 liter of water. An alloy is considered suitable for coating with vitreous enamel if the corrosion has advanced under the enamel layer from the edge of the specimen less than 3 mm after at least 24 hours or, for more rigorous requirements, after 96 hours.

It is known that aluminum alloys which contain magnesium will not pass the test unless the sheet specimens before being enamelled have been subjected to the usual pretreatment by an alkaline degreasing treatment, possibly a pickling treatment, followed by a rinsing with water, and to an additional surface-passivating treatment with chromatecontaining solutions. For this purpose, a magnesiumfree alloy in accordance with U.S. Standard specification 3003, having a restricted tolerance range (less than 0.01% by weight magnesium) is used for the above-mentioned purpose.

That alloy has by weight the following composition:
1.0 to 1.3% manganese,
0 to 0.4% silicon,
0 to 0.6% iron,
0 to 0.1% zinc,
0.1 to 0.2% copper,
balance aluminum.

After the above-mentioned test with antimony (III) chloride, this alloy does not exhibit any corrosion under the vitreous enamel layer. While the alloy has adequate strength, it has the disadvantage that it becomes soft as the vitreous enamel is baked, at temperatures above 500° C, and that finished products made therefrom, such as pots and pans, have no satisfactory buckling strength.

AlMgSi alloys, e.g., Material No. 3.3206 in accordance with German Industrial Standard DIN 1717, are also known for such purposes and undergo a renewed precipitation hardening after the vitreous enamel has been baked so that the softening phenomenon is avoided. On the other hand, the use of these alloys is economically limited because their Mg content requires an expensive and ecologically unsatisfactory treatment with a chromate-containing solution.

It is also known that AlCuMg alloys in certain tolerance ranges can be coated with vitreous enamel without an additional pretreatment with chromate-containing solutions and that these alloys can be subjected to the desired precipitation hardening. Nevertheless, the alloys cannot be widely used because they do not resist intergranular corrosion, to which the finished products are normally subjet.

It has thus been found that these alloys can be provided with a vitreous enamel coating having a satisfactory bond strength but the pans, pots and the like are destroyed after a short time of use by an intergranular corrosion of the material.

Another object of the invention is to provide an improved method of fabricating particular structures with an aluminum alloy of high deformability, resistance to corrosion and recrystallization temperature.

DESCRIPTION OF THE INVENTION

It has surprisingly been found that a wrought aluminum alloy which is composed on a weight basis of
0.8 to 2.2% manganese,
0.1 to 0.5% zirconium,
0 to 1.0 % iron,
0 to 0.6% silicon,
0 to 0.5% copper
0 to max. 0.1% magnesium,
balance aluminum and inevitable impurities due to manufacture is highly suitable for the purpose stated.

The recrystallization-inhibiting activity of the main alloying elements is so strong that test specimen which has been annealed twice at 350° C and is then tested at room temperature exhibits a loss of strength of only 10 to 20% compared to the strength in the cold-formed state.

Between 350° and 500° C, the alloy becomes soft and exhibits a decrease in ultimate tensile stress which is linear in a first approximation, at about 6.5 kg/mm² per 100° C, but there is no sharp decrease. The tests have clearly shown that this wrought aluminum alloy has a recrystallization temperature above 400° C.

BRIEF DESCRIPTION OF THE DRAWING

The sole FIGURE of the drawing is a graph in which the ultimate tensile stress, yield point and elongation at break are plotted along the ordinate and annealing temperature is plotted along the abscissa for alloys according to the invention and a comparison alloy.

SPECIFIC DESCRIPTION

Specimens of the wrought aluminum alloy in accordance with the invention were cold-formed with a deformation of 80% so that they were initially in a hard state and were then annealed for two hours at different temperatures. The ultimate tensile stress $\sigma_B$, the yield point $\sigma_{0.2}$ and the elongation at break $\delta_{10}$ were then determined at room temperature.

The yield points of an AlMg3 alloy that had been annealed for one hour are also plotted on the graph for comparison purposes. A curve which connects the plotted points for the comparison alloy follows the course which is generally known for wrought aluminum alloys, including a sharp decrease, which begins between 250° and 300° C, and resulting in a complete recrystallization at 350° C.

The corresponding temperatures for the alloy in accordance with the invention are higher by about 150° C so that the field of application of these alloys is substantially extended by this fact alone.

Moreover, at temperatures up to at least 400° C the strength values are much less dependent on temperature than those of the comparison alloy at about 300° C.

From the manufacturing aspect this has the considerably advantage that an intermediate state between hard and soft can be reached in a much simpler manner and much more accurately. For instance, when it is desired to adjust the comparison alloy to a certain strength between 260° and 320° C, the annealing temperature and annealing time must be very exactly controlled because variations of, e.g., only 10° C will result in considerable changes in strength. When it is considered that the temperature must obviously be kept between such narrow tolerance limits throughout the entire charge and at any point of the material which is being annealed, it is apparent that it is most difficult to reliably establish these alloys at, for example, a semi-hard state. It will also readily be understood that these difficulties in the manufacture are alleviated if the strength values are less dependent on the annealing temperature. Thus, the accompanying graph suffices to show the advantages which are afforded by the alloy in accordance with the invention with respect to its extended field of application and in manufacture.

Special advantages are afforded by the use of improved wrought aluminum alloy for purposes which require a material having a recrystallization temperature above 400° C. This wrought aluminum alloy can also be used to advantage for purposes which require that the loss of strength of the material at 400° C is less than 50% of the difference in strength between the hard and soft state.

It is also surprising that the addition of an alloying element, i.e., 0.1 to 0.5% by weight zirconium, in order to increase the strength or improve the structure does not result in a lower resistance to corrosion, as is often the case. The recrystallization-retarding activity of zirconium may be utilized and is not accompanied by a lower resistance to corrosion and a lower suitability for being coated with vitreous enamel. An alloy has thus been found which can be used wherever a material is required which begins to recrystallize at a higher temperature whereas the good deformability of the material, its resistance to corrosion and its suitability for being coated with vitreous enamel are not adversely affected.

For the manufacture of exhaust systems for internal-combustion engines, tube-bank heat exchangers, ducted plates for solar collectors and for saline water reclamation plants and the like, it is preferred within the scope of the invention to use a wrought aluminum alloy which contains iron and silicon in amounts of at least 0.2% each whereas the composition is the same in other respects.

For the manufacture of articles such as kitchen vessels, which must be coated with vitreous enamel and must resist corrosion and must have in the finished state a high buckling resistance, the zirconium content is preferably within the restricted range of 0.1 to 0.35% whereas the composition is the same in other respects.

According to a feature of the invention, the alloy contains at least 0.8% manganese and the remaining manganese content is replaced by up to 1% iron. It is also desirable to combine high manganese contents with low zirconium contents and vice versa.

According to yet another feature of the invention, the wrought aluminum alloy contains no copper and up to 0.02% magnesium. Finally, the wrought aluminum alloy in accordance with the invention may consist of 1.0 to 1.8% manganese, 0.15 to 0.3% zirconium, balance aluminum and unavoidable trace impurities which are due to manufacture. The wrought aluminum alloy can be used to advantage for purposes which require a material having a recrystallization temperature above 400° C. Another requirement imposed by the use resides in that the loss of the strength of the material at 400° C should be less than 50% of the difference in strength between the hard and soft states.

EXAMPLES

Wrought aluminum alloys having the following compositions have proved particularly desirable for the purposes according to the invention (by weight):

I 1.2 to 1.8% manganese,
0.15 to 0.30% zirconium,
0.2 to 0.7 % iron,
0.2 to 0.4 % silicon,
0 to 0.3 % copper,
0 to max. 0.1% magnesium,
balance aluminum and inevitable impurities which are due to the manufacture.

II 1.4 to 1.6% manganese,
0.2 to 0.3% zirconium,
0.4 to 0.6% iron,
0.2 to 0.4% silicon,
0 to 0.1% copper, 0 to max. 0.1% magnesium,
balance aluminum and inevitable impurities which are due to the manufacture.

In a preferred method of manufacturing semifinished products for use in accordance with the invention, a continuous casting is produced in the conventional manner from a melt having any of the stated compositions, the casting is lowered at a velocity of 40 to 80 mm per minute, the casting is held at a temperature of 450° to at most 500° C for 5 to 10 hours, the casting is then subjected to hot-forming (rolling) and subsequently deformed at least 50% (thickness reduction) to the desired cross-section of cold-forming (rolling), and the material is finally subjected to a recrystallizing annealing that the predetermined strength and ductility values are obtained (see the graph of the drawing).

The wrought aluminum alloy according to the invention is preferably used in the following fabricated states:

1. For automobile exhaust systems, particularly exhaust silencers and end pipes whose steels of various kinds are exclusively used at present. Exhaust systems made of uncoated steel have only a very short life. While the use of steel which is coated, e.g., aluminized, galvanized or coated with vitreous enamel, results in a somewhat longer life, this usually does not justify the much higher costs which are due to the coating, as a rule. High-grade steel is used in some cases but also involves high costs. All exhaust systems made of steel have the disadvantage that they are relatively heavy, which is inconsistent with the desire to minimize the weight of the vehicle.

Conventional aluminum alloys have not been used so far in such motor vehicle exhaust systems because they either cannot have an adequate high-temperature strength, or if they have an adequate high-temperature strength, they do not sufficiently resist corrosion on the inside by condensate formed from the exhaust gas and on the outside by saline water and that they do not have the high deformability which is required for the necessary folding and beading operations. All these disadvantages can be overcome by the use, in accordance with the invention, of the wrought aluminum alloy having the improved recrystallization behavior.

2. Heat exchangers where soldering operations are required. Because of the sharp reduction of strength upon heating of conventional alloys, the design of heat exchangers using them must be based on the strength values of the material in the soft state thereof so that much more material is required than for a structure based on the strength values of the material in the hard state. Besides, it is most difficult, as has been stated hereinbefore, to produce by the conventional heat treatments a specific combination of strength and ductility, as is often required for the manufacture of heat exchangers.

Owing to its desirable recrystallization behavior, the wrought aluminum alloy in accordance with the invention can easily be adjusted to various states so that a high deformability, which is required to bend or expand heat exchanger tubes, is assured and the strength values are higher than those of the conventional wrought aluminum alloys. Specifically, the alloys in accordance with the invention permit of soldering operations in the course of the manufacture of heat exchangers because there will be no less of strength to a soft state in the short time required for soldering. For this reason, the design can be based on higher strength so that the amount of material required and the costs are reduced.

3. The manufacture of ducted plates for use in the temperature range of 20° to 250° C. Ducted plates consist of two plates, which are joined by sealed assembly rolling, except for a duct pattern, which is subsequently expanded by fluid introduced under pressure between the plates. Such plates have previously been used mainly in refrigeration engineering in evaporators for refrigerators and freezers, where the recrystallization and softening are not significant. Because the inflating operation requires a high deformability and certain ultimate tensile stresses, the conventional aluminum materials cannot be employed because they do not permit of a useful compromise of ductility and ultimate tensile stress.

The material in accordance with the invention enables the manufacture of ducted plates for use at temperatures up to 250° C so that the ducted plates, which have very good structural properties, can be used also as solar collectors and as heat exchangers for a reclamation of saline water.

It will be understood that the claimed aluminum alloy cannot only be used for the purposes stated hereinbefore, such as kitchen vessels, but also in all other cases where the same or similar requirements must be met. The finished products have a firmly adhering vitreous enamel coating and exhibit no corrosion under this coating after the antimony (III) chloride test. They resist all corrosive attacks to be expected and have a much higher buckling strength than articles made from an AlMn alloy which contains no zirconium. The buckling strength depends on the yield point, which in finished products made from the material to be used in accordance with the invention is much higher than in such products made from the AlMn alloys in accordance with U.S. Standard 3003, which can be coated with vitreous enamel.

We claim:

1. A part subject to corrosion which is constituted of a wrought aluminum alloy which is composed, on a weight basis, of
   0.8 to 2.2% manganese
   0.1 to 0.5% zirconium
   0.2 to 0.7% iron
   0.2 to 0.6% silicon
   0 to 0.5% copper
   0 to max. 0.1% magnesium
   balance aluminum and inevitable impurities which are due to the manufacture, said alloy having been subjected after casting to a temperature of 450° C to 500° C for a period of 5 to 10 hours and hot and cold working so as to have the characteristics of good deformability, resistance to corrosion, and a recrystallization temperature above 400° C.

2. The part defined in claim 1 wherein said wrought aluminum alloy contains zirconium in a range of 0.1 to 0.35% by weight, said part being a kitchen utensil coated with vitreous enamel and resistant to corrosion and having a high buckling strength.

3. The part defined in claim 2 wherein said wrought aluminum alloy is free from copper and contains max. 0.02% by weight magnesium.

4. The part defined in claim 1 wherein said wrought aluminum alloy has a loss of strength upon deformation at 400° C which is less than 50% of the difference in strength between the hard and soft state of the material.

5. The part defined in claim 1 wherein said wrought aluminum alloy consists, on a weight basis, of
   1.2 to 1.8% manganese 0.15 to 0.30% zirconium
0.2 to 0.7% iron
0.2 to 0.4% silicon
0 to 0.3% copper
0 to max. 0.1% magnesium
balance aluminum and inevitable impurities which are due to the manufacture.

6. The part defined in claim 1 wherein said wrought aluminum alloy consists, on a weight basis, of
1.4% to 1.6% manganese
0.2 to 0.3% zirconium
0.4 to 0.6% iron
0.2 to 0.4% silicon
0 to 0.1% copper
0 to max. 0.17% magnesium
balance aluminum and inevitable impurities which are due to the manufacture.

7. A wrought aluminum alloy which has been cast and subjected after casting to a temperature of 450° C to 500° C for 5 to 10 hours and hot and cold working, said alloy having a recrystallization temperature above 400° C and consisting essentially of:
0.8 to 2.2% by weight manganese,
0.1 to 0.5% by weight zirconium,
0.2 to 1.0% by weight iron,
0.2 to 0.6% by weight silicon
0 to 0.5% by weight copper,
0 to 0.1% by weight magnesium,
balance aliminum and unavoidable impurities.

8. The alloy defined in claim 7 which contains 0.1 to 0.35% by weight zirconium.

9. The alloy defined in claim 7 which consists of:
1.2 to 1.8% by weight manganese,
0.15 to 0.30% by weight zirconium,
0.2 to 0.7% iron,
0.2 to 0.4% silicon,
0 to 0.3% copper,
0 to max. 0.1% magnesium,
balance aluminum and inevitable impurities which are due to the manufacture.

10. The alloy defined in claim 7 which consists of:
1.4% to 1.6% by weight manganese,
0.2 to 0.3% by weight zirconium,
0.4 to 0.6% by weight iron,
0.2 to 0.4% by weight silicon,
0 to 0.1% by weight copper
0 to max. 0.1% by weight magnesium,
balance aluminum and inevitable impurities which are due to the manufacture.

* * * * *